(12) United States Patent
Anderson

(10) Patent No.: US 6,439,673 B2
(45) Date of Patent: Aug. 27, 2002

(54) ELECTRO-HYDRAULIC BRAKING SYSTEMS

(75) Inventor: Robert Alan Anderson, Solihull (GB)

(73) Assignee: Lucas Industries Limited (GB)

( * ) Notice: Subject to any disclaimer, the term of this patent is extended or adjusted under 35 U.S.C. 154(b) by 0 days.

(21) Appl. No.: 09/815,990

(22) Filed: Mar. 23, 2001

Related U.S. Application Data

(63) Continuation of application No. PCT/GB99/03151, filed on Sep. 22, 1999.

(30) Foreign Application Priority Data

Sep. 23, 1998 (GB) ............................................... 9820621

(51) Int. Cl.⁷ .............................. B60T 8/36; B60T 13/68
(52) U.S. Cl. ................................ 303/119.3; 303/116.4; 303/DIG. 10
(58) Field of Search ........................... 303/119.2, 119.3, 303/116.4, DIG. 10

(56) References Cited

U.S. PATENT DOCUMENTS

| | | | |
|---|---|---|---|
| 4,932,728 A | * | 6/1990 | Schenk et al. ........... 303/119.3 |
| 5,474,108 A | | 12/1995 | Inden et al. |
| 5,820,228 A | * | 10/1998 | Schneider et al. ....... 303/119.3 |
| 5,866,822 A | | 2/1999 | Willig .......................... 73/719 |
| 5,937,898 A | | 8/1999 | Gluf, Jr. et al. |
| 6,007,162 A | | 12/1999 | Hinz et al. |
| 6,234,199 B1 | * | 5/2001 | Nohira ..................... 303/119.3 |

FOREIGN PATENT DOCUMENTS

| | | |
|---|---|---|
| DE | 19514383 | 10/1996 |
| DE | 19521832 | 12/1996 |
| EP | 0803652 A2 | 10/1997 |
| GB | 287358 A | 9/1995 |

* cited by examiner

Primary Examiner—Matthew C. Graham
(74) Attorney, Agent, or Firm—MacMillan, Sobanski & Todd, LLC

(57) ABSTRACT

In an electro-hydraulic braking system a housing is provided having at least three discrete housing portions (1, 2, 3), a first portion being adapted to contain electrical drive circuitry for said at least one actuator, the second portion being adapted to contain hydraulic flow passages to and from the electrically operated actuator, and the third portion being adapted to house one or more pressure sensors. On assembly of the housing, electrical contacts from the one or more pressure sensors in the third portion provide a connection between the one or more pressure sensors and the electrical circuitry contained in the first portion, and hydraulic passages extending from the pressure sensors in the third portion provide a connection between one or more pressure sensors and fluid passages in the second portion.

10 Claims, 3 Drawing Sheets

ELECTRO-HYDRAULIC BRAKING SYSTEMS

This application is a continuation of PCT/GB99/03151, filed Sep. 22, 1999.

This invention relates to electro-hydraulic braking systems of the kind in which at least one electrically operated actuator is provided in a brake line between a fluid source and a brake, operation of the electrically operated actuator selectively connecting and disconnecting the brake to the pressure source, and in which a pressure sensor is provided which is adapted to sense the fluid pressure in a part of the braking system.

The provision of at least one pressure sensor in the hydraulic circuit enables a measure of circuit performance and behaviour to be made. Because the system comprises both electrical circuitry—for control of the actuators and interrogation of the pressure sensors—and hydraulic circuitry, there is a problem of leakage of fluid from the hydraulic circuit affecting the electrical circuit.

In the past, it has been known to incorporate the hydraulic and electrical components into a two part housing. One part of the housing contains the electrical circuitry for controlling the actuators. The other part contains the hydraulic passages for the brake fluid. Where the electrically operated actuators are controlled by a solenoid which comprises of an armature working with a coil, the coils of the solenoid are adapted to be fixed relative to and extend from the first housing. The armature is then adapted to extend from the second housing and be sealed therewith. As the two halves of the housing are placed together, the coils pass over the armature to complete the magnetic circuit of the electrically-controlled actuators.

The applicant is aware of U.S. Pat. No. 6,007,162 which discloses a braking system in which a number of pressure sensors are housed within respective casings that are pressed into engagement with a respective pressure conduit extending from the actuators in order to permit an increase of the pressure to be obtained. However, each sensor is housed separately and they cannot be readily removed for servicing.

In accordance with the present invention we provide an electro-hydraulic braking system in which at least one electrically operated actuator is provided in a brake line between a pressure source of hydraulic fluid and a brake, operation of the electrically operated actuator selectively connecting and disconnecting the brake to the pressure source, and in which at least one pressure sensor is adapted to sense fluid pressure in a part of the braking system, the system being characterised by a housing having at least three discrete housing portions, a first portion being adapted to contain electrical drive circuitry for the actuator, a second portion being adapted to contain hydraulic fluid passages to and from the electrically operated actuator, and a third portion being adapted to house a plurality of pressure sensors, in which on assembly of the housing electrical contacts from the pressure sensors in the third portion provide a connection between the pressure sensors and the electrical drive circuitry contained in the first portion, and a respective hydraulic fluid passage extending from each of the pressure sensors in the third portion provides a connection between the pressure sensors and corresponding hydraulic fluid passages in the second portion.

Thus, the invention provides a separate housing portion a plurality of pressure sensors. This allows the pressure sensor(s) to be easily replaced or removed as a group from both the electrical circuitry and the hydraulic circuits.

Preferably, the third portion comprises a body having a plurality of through bores, a pressure sensor being provided within a respective bore. Each sensor may be provided within a tube which is adapted to fit within a bore in the body, an end portion of the tube extending outwardly away from the bore. The end portion of tube can be inserted into a corresponding recessed hole in the second portion to provide a hydraulic connection. Electrical connections to the pressure sensor may extend from one end of the tube.

As an alternative the body may be split into two halves which clamp around the tubes containing the pressure sensors. Of course, the tubes could be omitted in at least one alternative.

A temperature sensor may be provided within the pressure sensor housing to allow the temperature of the hydraulic fluid to be measured.

A temperature sensor may be provided for each pressure sensor, to measure the temperature of the fluid reaching each pressure sensor. Alternatively, any number of temperature sensors may be provided.

The third portion housing the pressure sensors may further include an engagement means adapted to enable the pressure sensor housing to be mechanically secured to the first housing portion. The engagement means may comprise a number of holes 30, illustrated in FIGS. 1, 3(*a*), and 3(*b*), adapted to receive one or more bolts which engage with threaded blind bores 32, illustrated in FIG. 2, in the first housing portion. Alternatively, the pressure sensor housing may be a snap-fit engagement with the first housing portion.

The openings in the ends of the tubes which allow fluid from the second housing to reach the pressure sensors may extend axially in the same direction as the axis of the coils for the solenoid valves, so that the pressure sensor tubes readily slide into the respective holes in the second portion simultaneous with the coils sliding around and onto the armatures of the flow valves during assembly.

An annular seal such as an elastomeric seal may be provided around the end of each protruding portion of tube to form a fluid tight seal within the respective hole in the second portion on assembly. The seal may be located in a groove extending around the tube. A second annular seal may be provided between the tube and the bore in the third portion.

Alternatively, or additionally, an elastomeric seal may be provided in a recess which links the ends of all the tubes. The seal may be located in a recess in a face of the third body. The individual seals could then be omitted from each tube. In yet another alternative, the recess linking the ends of the tubes may be adapted to connect a portion of the end of the tube to atmosphere when the third portion is pressed against the second portion to ensure there is no difference between the pressure on the side of the second housing and the measured pressure on the side of the third housing.

The electrical circuitry may be sealed within the first portion at least with respect to the interface between the first portion and the second portion.

One or more solenoid coils may be located in or mounted on the first portion, each coil forming a part of a solenoid for a respective electrically controlled valve. The armature corresponding to each valve may be supported by the second portion. The armature may be sealed to prevent leakage of fluid past the armature/housing interface. The armature may pass into the coil when the first and second housing portions are assembled together.

The third portion may be adapted to be received, at least partially, within a recess in the first portion. When the first and second portions are assembled, the third portion may be completely encased by the first and second portions.

The first and second housing portions may be provided with a continuous seal around a perimeter of the mating faces to seal the inside of the two housing portions together when assembled.

There will now be described, by way of example only, one embodiment of the present invention with reference to the accompanying drawings of which.

DETAILED DESCRIPTION OF THE INVENTION

Figure 1:
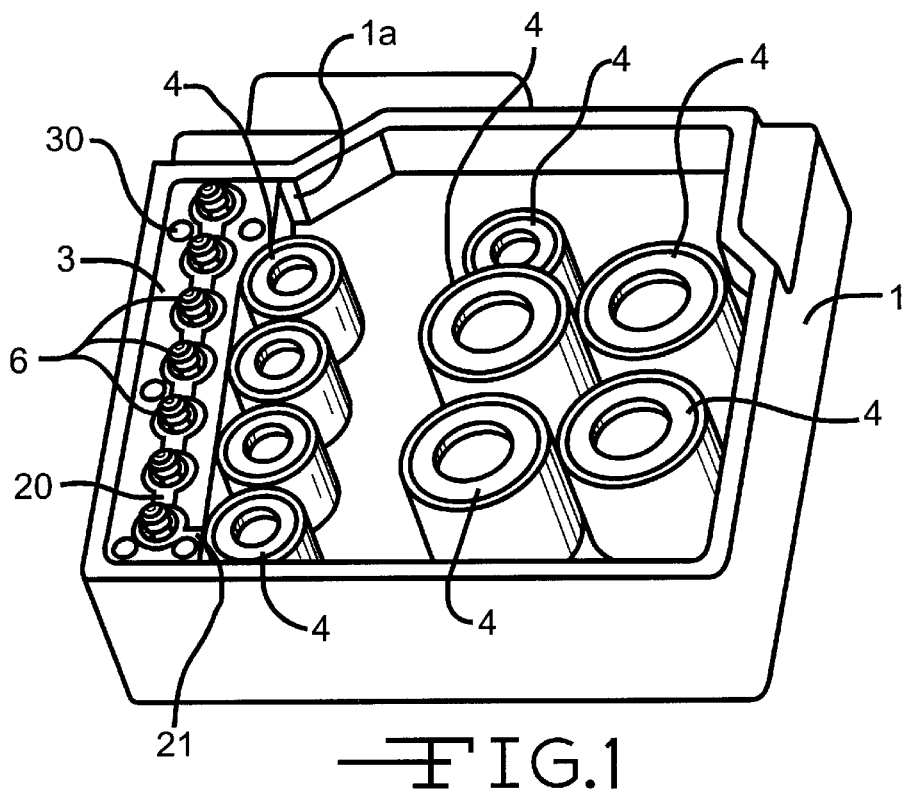
FIG. 1 is a perspective view of a first housing portion of a three-part housing for part of an electro-hydraulic braking system.
Figure 2:
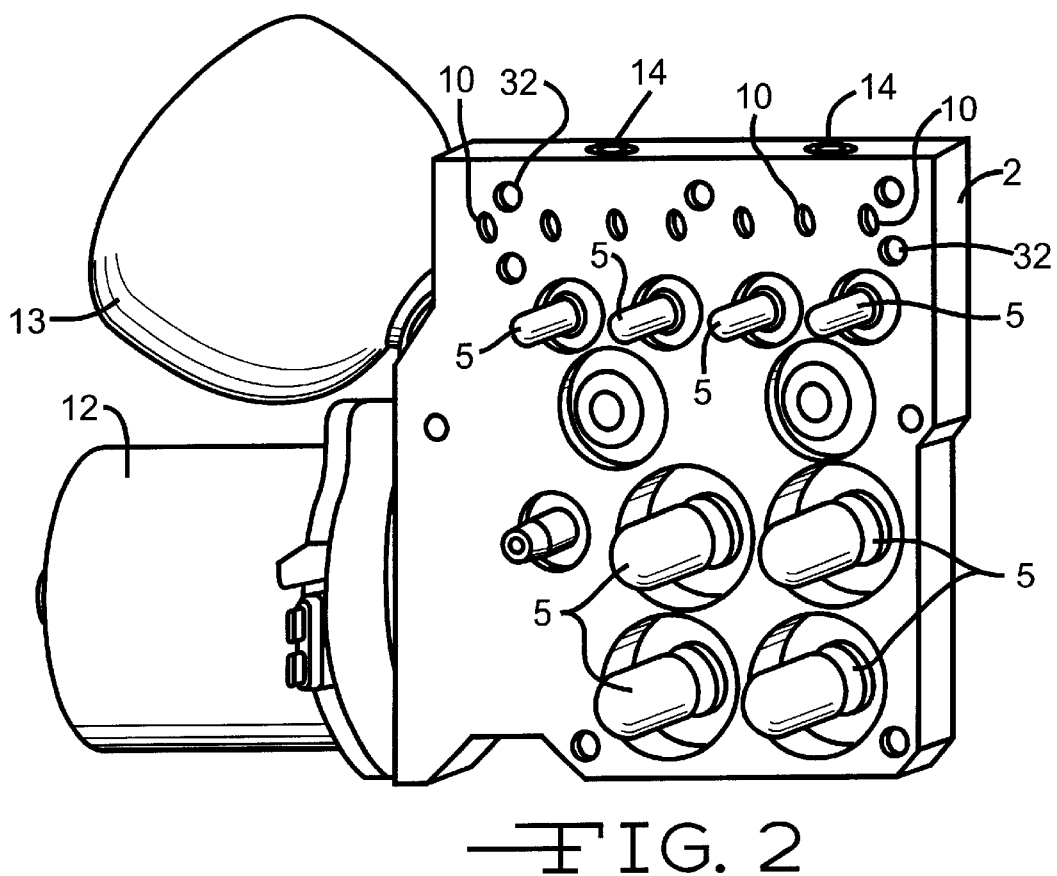
FIG. 2 is a perspective view of a second housing portion of the three-part housing of FIG. 1.

FIGS. 1 to 3 illustrate three portions 1,2,3 of a three-part housing for part of an electro-hydraulic braking system.

The system comprises a number of solenoid actuated flow control valves. Each of the valves include a solenoid comprising an electrical coil 4 which surrounds an armature 5 when assembled. An electrical drive circuit contained within the first portion supplies current to one or more of the coils 4 in response to a braking demand signal to move the armature 5, in turn to open and close the valves.

In order to provide isolation between the hydraulic part of the circuitry and the electrical part of the circuit, the valves are split into two parts. A first part comprising of the coils 4 is mounted relative to the first housing portion 1 which contains the electrical drive circuitry. A second part comprising of the armature 5 of the hydraulic valve and the hydraulic fluid lines are provided in the second housing portion 2 with the armature 5 protruding from a mating face of the second portion 2.

On assembly of the housing, the first and second housing portions are pushed together so that each armature slides into the respective coil. This completes the valve assembly. Such an arrangement is beneficial in allowing the electrical circuitry to be easily removed from the hydraulic circuitry without any need for draining the hydraulic fluid since no hydraulic connections are altered.

Figure 3A:
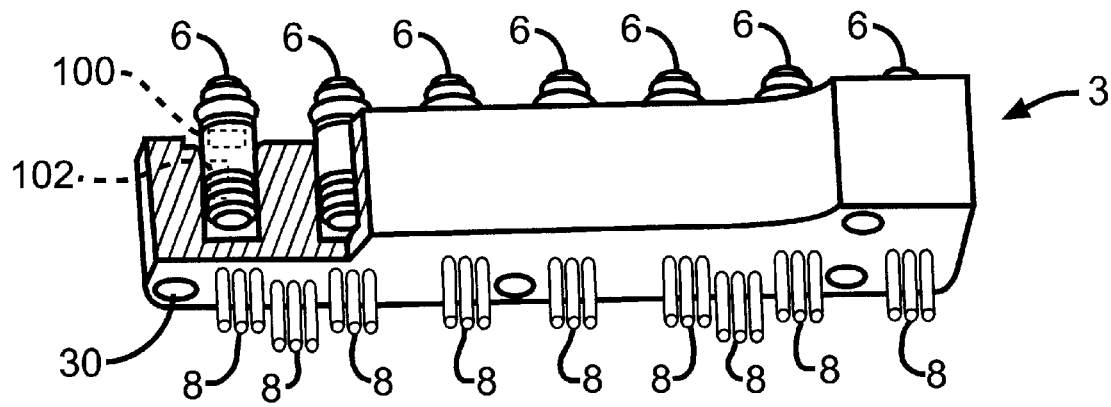
FIG. 3(a) is a first perspective view and (b) is a second perspective view of a third housing portion of the three-part housing.
Figure 3B:
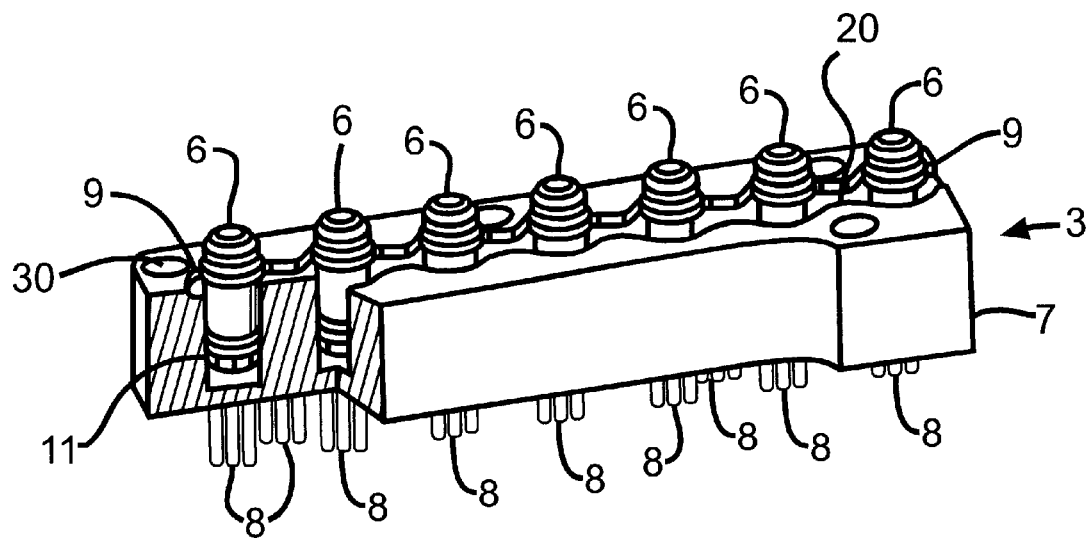
Figure 4:
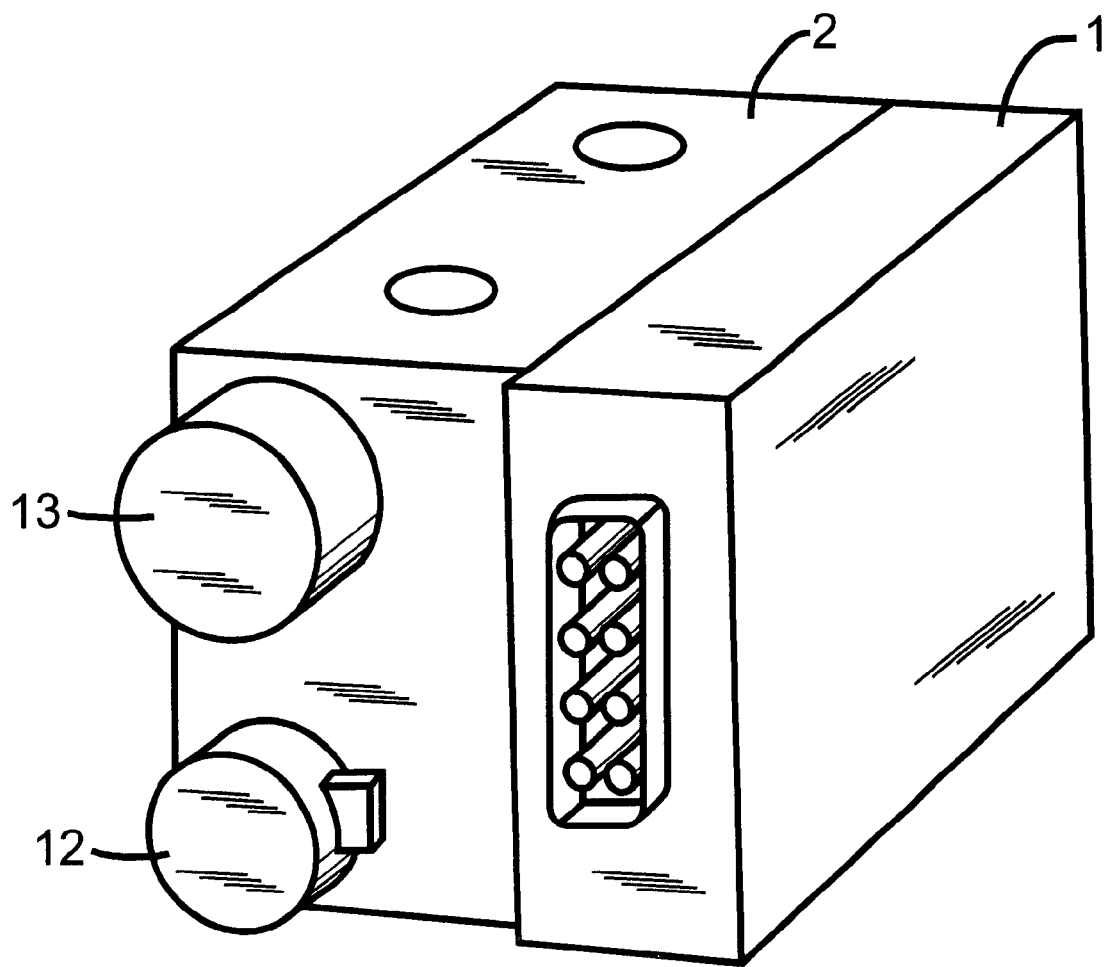
FIG. 4 shows the fully assembled three-part housing portions.

In addition to housing the electric drive circuitry and the solenoid coils 4, the first housing portion 1 includes a recess 1a in the mating face adapted to receive the third housing portion 3, shown in detail in FIGS. 1, 3(a) and 3(b) of the accompanying drawings.

The third portion comprises of a main body which receives a number of pressure sensors 100. Each pressure sensor 100 is provided at the end of a tube 6 adapted to be inserted in a respective bore on the main body. The tubes received hydraulic fluid from passages 10 in the second housing portion 2. Electrical connectors 8 extend from the rear of the pressure sensors to allow electrical connections between the pressure sensors and further electrical circuitry in the first housing 1. A temperature sensor 102 may be provided for each pressure sensor 100, to measure the temperature of the fluid reaching each pressure sensor 100. Alternatively, any number of temperature sensors 102 may be provided. The pressure sensor 100 and the temperature sensor 102 are shown in block form.

Each tube associated with a respective pressure sensor is provided with a circumferential elastomeric seal 11. The seal 11 forms a fluid tight seal between the tube and the bore in the housing. Each tube extends beyond the housing and carries a second circumferential seal 9 adjacent its extended end. The extended portion of tube is adapted to fit within the passage 10 in the second housing portion 2 which connects to a part of the hydraulic circuit.

As shown in the accompanying figures, the main body carries seven sensors in a line. The axis of the tubes for the sensors is selected to coincide with the axis of the solenoid coils so that the tubes enter the respective holes in the second housing as the coils are slid over the armatures.

A recess 20 connects the ends of the tubes 6 so that as the seals on the end of the holes 6 are pressed into the openings in the second housing portion, atmospheric pressure is present on the side of the seals on the end of the tubes which faces away from the second housing. The recess 20 may therefore be connected by an extending passage 21 to the atmosphere. Alternatively, it may receive an elastomeric seal (not shown).

As shown in FIG. 2, the second housing 2 also carries a casing for an electric motor or pump and a pressure accumulator 13. Of course, the electric motor 12 could be mounted onto the first housing portion.

Finally, as shown in FIG. 2, a number of connecting ports 14 allow brake lines to be connected to the hydraulic circuitry in the second housing to connect fluid supply and brakes to the solenoid-actuated valves.

What is claimed is:

1. An electro-hydraulic braking system including at least one electrically operated actuator which is provided in a brake line between a pressure source of hydraulic fluid and a brake, operation of said electrically operated actuator selectively connecting and disconnecting said brake to said pressure source, and wherein at least one pressure sensor is arranged to sense fluid pressure in a part of said braking system said system further including a housing having at least three discrete housing portions, a first portion containing electrical drive circuitry for said actuator, a second portion containing hydraulic fluid passages to and from said electrically operated actuator, and a third portion housing a plurality of pressure sensors, in which on assembly of said housing electrical contacts from said pressure sensors in said third portion provide a connection between said pressure sensors and said electrical drive circuitry contained in said first portion, and a respective hydraulic fluid passage extending from each of said pressure sensors in said third portion provides a connection between said pressure sensors and corresponding hydraulic fluid passages in said second portion.

2. An electro-hydraulic braking system according to claim 1 wherein said third portion comprises a body having a plurality of through bores, each of said pressure sensors being provided within a respective one of said bores.

3. An electro-hydraulic braking system according to claim 2 wherein each sensor is provided within a tube which is adapted to fit within a respective bore in said body, an end portion of said tube extending outwardly away from said bore.

4. An electro-hydraulic braking system according to claim 2 wherein said body is split into two halves which clamp around said tube or tubes containing said pressure sensors.

5. An electro-hydraulic braking system according to claim 1 wherein at least one temperature sensor is provided within said third portion to allow the temperature of said hydraulic fluid to be measured.

6. An electro-hydraulic braking system according to claim 5 wherein a temperature sensor is provided for each pressure sensor, to measure the temperature of the fluid reaching each pressure sensor.

7. An electro-hydraulic braking system according to claim 1 wherein said third portion housing said pressure sensors further includes an engagement means adapted to enable said pressure sensor housing to be mechanically secured to said first housing portion.

8. An electro-hydraulic braking system according to claim 7, wherein said pressure sensor housing is a snap-fit engagement with said first housing portion.

9. An electro-hydraulic braking system according to claim 3, wherein an annular seal is provided around an end of each protruding portion of tube to form a fluid tight seal within a respective bore provided in said second portion.

10. An electro-hydraulic braking system according to claim 1 wherein one or more solenoid coils are located in or mounted on said first portion, each coil forming a part of a solenoid for a respective electrically controlled valve, an armature corresponding to each valve being supported by said second portion so that said armature passes into said coil when said first and second housing portions are assembled together.

* * * * *